US012782517B2

(12) United States Patent
Nishida et al.

(10) Patent No.: US 12,782,517 B2
(45) Date of Patent: Nov. 3, 2026

(54) # LiDAR DEVICE

(71) Applicant: Mitsubishi Electric Corporation, Tokyo (JP)

(72) Inventors: Mio Nishida, Tokyo (JP); Kenichi Hirosawa, Tokyo (JP); Takayuki Yanagisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 762 days.

(21) Appl. No.: 18/197,917

(22) Filed: May 16, 2023

(65) Prior Publication Data

US 2023/0280448 A1 Sep. 7, 2023

Related U.S. Application Data

(63) Continuation of application No. PCT/JP2021/002938, filed on Jan. 28, 2021.

(51) Int. Cl.
*G01S 7/481* (2006.01)

(52) U.S. Cl.
CPC .......... *G01S 7/4815* (2013.01); *G01S 7/4811* (2013.01); *G01S 7/4818* (2013.01)

(58) Field of Classification Search
CPC .... G01S 7/4815; G01S 7/4811; G01S 7/4818; G01S 7/4812; G01S 17/89; G01S 17/58; G01S 17/95; G01P 5/26; Y02A 90/10
See application file for complete search history.

(56) References Cited

U.S. PATENT DOCUMENTS 7,187,492 B1 * 3/2007 Shay .................... H01S 3/2383 342/372
2006/0071846 A1 * 4/2006 Yanagisawa ........... G01S 7/481 342/54

(Continued)

FOREIGN PATENT DOCUMENTS

JP 5-160473 A 6/1993
JP 6-90051 A 3/1994

(Continued)

OTHER PUBLICATIONS

Chinese Office Action and Search Report for Chinese Application No. 202180089335.3, dated Aug. 27, 2025, with English translation.

(Continued)

*Primary Examiner* — Yuqing Xiao
*Assistant Examiner* — Jempson Noel
(74) *Attorney, Agent, or Firm* — Birch, Stewart, Kolasch & Birch, LLP

(57) ABSTRACT

Herein disclosed is a LiDAR device including: a light source to output laser light; a demultiplexer/distributor to receive the laser light output from the light source and to output local oscillation light and signal light beams; amplifiers to amplify the respective signal light beams; light transmission/reception devices to emit, as transmission light, the signal light beams into space, and to receive, as reception light, scattered light from a measurement target present in space; a signal processing device to calculate a distance to the measurement target and a property of the measurement target on a basis of the reception light from the light transmission/reception devices and the local oscillation light from the demultiplexer/distributor; and transmission/reception separation devices to couple the transmission light from the amplifiers to the respective light transmission/reception devices and to couple the reception light received by the (Continued)

respective light transmission/reception devices to the corresponding signal processing device.

12 Claims, 7 Drawing Sheets

(56) References Cited

U.S. PATENT DOCUMENTS

| | | | | |
|---|---|---|---|---|
| 2008/0037028 | A1* | 2/2008 | Cheung | H01S 3/2383 356/478 |
| 2009/0262761 | A1* | 10/2009 | Khitrov | H01S 3/06754 372/6 |
| 2010/0290106 | A1* | 11/2010 | DiGiovanni | H01S 3/302 359/334 |
| 2016/0226210 | A1 | 8/2016 | Zayhowski et al. | |
| 2017/0153319 | A1* | 6/2017 | Villeneuve | G01S 7/484 |
| 2018/0356440 | A1* | 12/2018 | Kotake | G01F 1/661 |
| 2018/0356528 | A1* | 12/2018 | Schaffner | G01S 7/483 |
| 2019/0018144 | A1 | 1/2019 | Imaki et al. | |
| 2019/0257927 | A1 | 8/2019 | Yao | |
| 2019/0353977 | A1 | 11/2019 | Hung | |
| 2020/0041616 | A1 | 2/2020 | Stochino | |

FOREIGN PATENT DOCUMENTS

| | | | |
|---|---|---|---|
| JP | 2003-307567 | A | 10/2003 |
| JP | 2010-177221 | A | 8/2010 |
| WO | WO 2017/130315 | A1 | 8/2017 |
| WO | WO 2020/217267 | A1 | 10/2020 |

OTHER PUBLICATIONS

International Search Report (PCT/ISA/210) issued in PCT/JP2021/002938, dated Mar. 9, 2021.

Japanese Notification of Reason for Refusal dated Oct. 12, 2021 in Japanese Patent Application No. 2021-529379.

Written Opinion of the International Searching Authority (PCT/ISA/237) issued in PCT/JP2021/002938, dated Mar. 9, 2021.

European Communication pursuant to Article 94(3) EPC for European Application No. 21 922 830.1, dated Aug. 29, 2024.

Extended European Search Report for European Application No. 21922830.1, dated Nov. 24, 2023.

* cited by examiner

LiDAR DEVICE

CROSS REFERENCE TO RELATED APPLICATIONS

This application is a Continuation of PCT International Application No. PCT/JP2021/002938 filed on Jan. 28, 2021, which is hereby expressly incorporated by reference into the present application.

TECHNICAL FIELD

The present disclosure relates to a LiDAR device that emits signal light into space, receives scattered light from a measurement target present in space, and calculates a distance to the measurement target and a speed of the measurement target.

BACKGROUND ART

This type of LiDAR device is disclosed in Patent Literature 1.

Patent Literature 1 discloses a monostatic LiDAR device that switches an irradiation direction of laser light with an optical switch, emits laser light in many directions, receives scattered light from a measurement target, and calculates a distance to the measurement target and a speed of the measurement target.

CITATION LIST

Patent Literature

Patent Literature 1: WO 2017-130315 A

SUMMARY OF INVENTION

Technical Problem

In the monostatic LiDAR device disclosed in Patent Literature 1, an irradiation direction of laser light is switched with a switch, and therefore it is easy to reduce a device size and a price and reliability is also high as compared with a configuration in which the irradiation direction of the laser light is mechanically operated.

Meanwhile, light obtained by transmission light being backscattered by the optical switch may be mixed into reception light, and it is desired to further increase an SN ratio (signal-to-noise ratio) of a reception signal.

The present disclosure has been made in view of the above problem, and an object of the present disclosure is to provide a LiDAR device that emits laser light in a plurality of directions, receives scattered light from a measurement target, and calculates a distance to the measurement target and a speed of the measurement target, in which an SN ratio of a reception signal based on the scattered light from the measurement target is increased.

Solution to Problem

A LiDAR device according to the present disclosure includes: a light source to output laser light; a demultiplexer/distributor to receive the laser light output from the light source and to output local oscillation light and a plurality of signal light beams; a plurality of amplifiers corresponding to the respective signal light beams output from the demultiplexer/distributor, the plurality of amplifiers being configured to amplify the respective signal light beams, a plurality of light transmission/reception devices disposed in such a manner that radiation directions thereof differ from each other, the plurality of light transmission/reception devices corresponding to the respective amplifiers, and being configured to emit, as transmission light, the signal light beams output from the corresponding amplifiers into space, and to receive, as reception light, scattered light from a measurement target present in space by the transmission light from the light transmission/reception devices; a signal processing device to calculate a distance to the measurement target and a property of the measurement target on a basis of the reception light from the plurality of light transmission/reception devices and the local oscillation light from the demultiplexer/distributor; and a plurality of transmission/reception separation devices corresponding to the respective amplifiers and the respective light transmission/reception devices, the plurality of transmission/reception separation devices being configured to couple the transmission light from the amplifiers to the respective light transmission/reception devices and to couple the reception light received by the respective light transmission/reception devices to the corresponding signal processing device.

Advantageous Effects of Invention

According to the present disclosure, since transmission light is separated by the demultiplexer/distributor before the transmission/reception separation device, it is possible to prevent unnecessary scattered light from the demultiplexer/distributor from being mixed in the reception light and to increase an SN ratio of a reception signal based on the reception light.

DESCRIPTION OF EMBODIMENTS

First Embodiment

Figure 1:
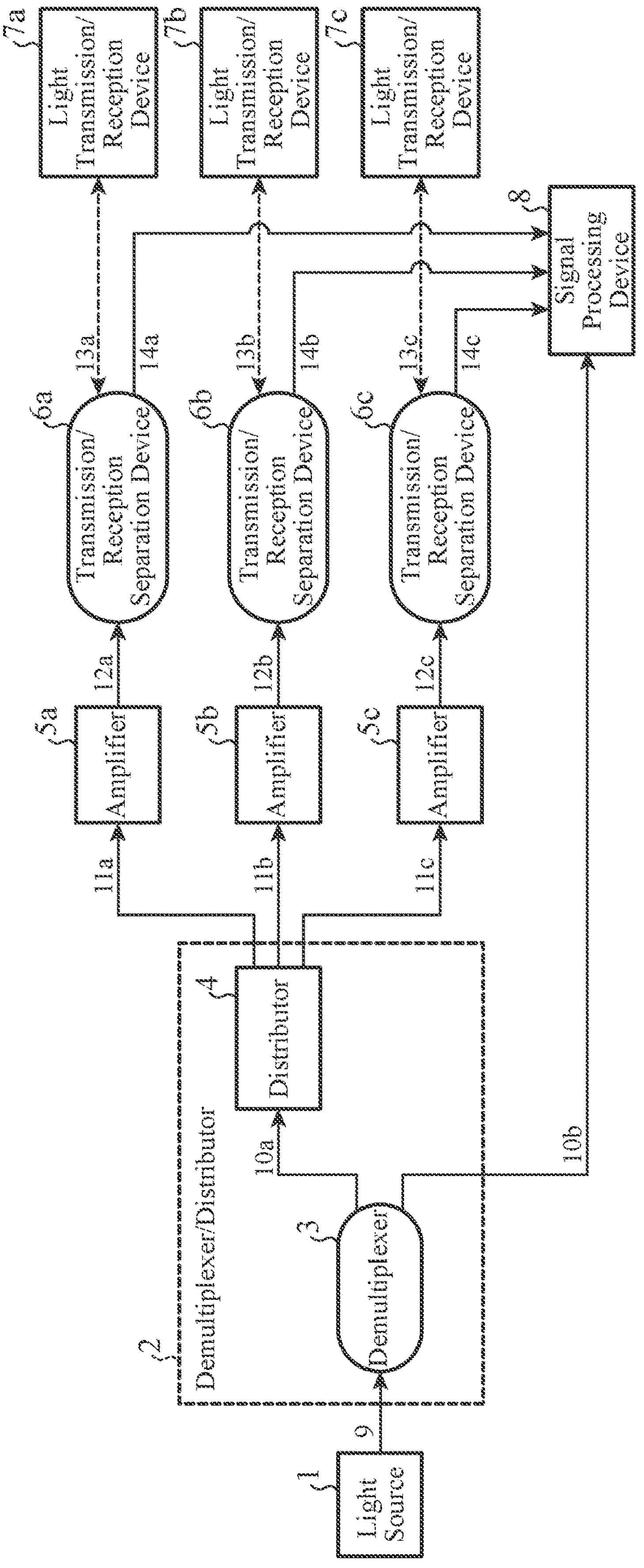
FIG. 1 is a configuration diagram illustrating a LiDAR device according to a first embodiment.

A LiDAR (Light Detection and Ranging, Laser Imaging Detection and Ranging) device according to a first embodiment w % ill be described with reference to FIG. 1.

The LiDAR device according to the first embodiment covers a monostatic LiDAR device that emits laser light in a plurality of directions, receives scattered light from a measurement target, and calculates a distance to the measurement target and a property of the measurement target. That is, the LiDAR device according to the first embodiment covers a LiDAR device including a plurality of light transmission/reception devices that emits signal light generated by laser light into space as transmission light and receives scattered light from a measurement target present in space as reception light.

The property of the measurement target is a speed of wind which is the measurement target, that is, a wind speed in a case of targeting a wind measurement Doppler LiDAR device, a contrast of an image of an imaging target which is the measurement target in a case of targeting a LiDAR device used for three-dimensional high-speed imaging that measure a distances and performs imaging, or a concentration of a measurement target gas which is the measurement target in a case of targeting a LiDAR device used for gas concentration measurement that measures a concentration distribution of the measurement target gas.

The LiDAR device includes a light source 1, a demultiplexer/distributor 2 including a demultiplexer 3 and a distributor 4, a plurality of amplifiers 5, a plurality of transmission/reception separation devices 6, a plurality of light transmission/reception devices 7, and a signal processing device 8.

The first embodiment illustrates a case where each of the plurality of amplifiers 5, the plurality of transmission/reception separation devices 6, and the plurality of light transmission/reception devices 7 includes three devices, first to third devices. The first to third devices are distinguished from each other by adding a to c after the reference numerals, but in a case where description is simplified, for example, in a case where common matters are described, a to c to be added are omitted.

In addition, in the first embodiment, the number of amplifiers 5, the number of transmission/reception separation devices 6, and the number of light transmission/reception devices 7 are all three, but may be two, or may be four or more.

In short, the same number of amplifiers 5 and the same number of transmission/reception separation devices 6 as the number of light transmission/reception devices 7 which are disposed for emitting laser light in a plurality of directions and receiving scattered light from a measurement target are disposed.

That is, the light transmission/reception devices 7, the amplifiers 5, and the transmission/reception separation devices 6 are disposed so as to correspond to each other, respectively.

Specifically, a first light transmission/reception device 7*a*, a first amplifier 5*a*, and a first transmission/reception separation device 6*a* correspond to each other, a second light transmission/reception device 7*b*, a second amplifier 5*b*, and a second transmission/reception separation device 6*b* correspond to each other, and a third light transmission/reception device 7*c*, a third amplifier 5*c*, and a third transmission/reception separation device 6*c* correspond to each other.

The light source 1, the demultiplexer 3, the distributor 4, the plurality of amplifiers 5, the plurality of transmission/reception separation devices 6, and the signal processing device 8 are connected to each other by light transmission means which are optical fiber cables 9 to 12 and 14.

Note that the light transmission means which are optical fiber cables 9 to 12 and 14 are not limited to the optical fiber cables, and may be those that optically couple the light source 1, the demultiplexer 3, the distributor 4, the plurality of amplifiers 5, the plurality of transmission/reception separation devices 6, and the signal processing device 8 to each other by free space propagation.

The plurality of transmission/reception separation devices 6 and the plurality of light transmission/reception devices 7 are optically coupled to each other by free space propagation, and the free space propagation is represented as light transmission means 13 in the drawings.

The light source 1 outputs laser light. The light source 1 outputs laser light having a single wavelength, or outputs laser light having a plurality of mutually different wavelengths.

In a case where the light source 1 outputs laser light having a plurality of mutually different wavelengths, the light source 1 outputs the laser light by temporally changing a wavelength, or simultaneously outputs the laser light having a plurality of mutually different wavelengths.

In addition to the fiber laser described above, the light source 1 may be constituted by a semiconductor laser, a solid-state laser, or a combination thereof.

The demultiplexer 3 divides the laser light output from the light source 1 and transmitted via the optical fiber cable 9 into signal light and local oscillation light.

A division ratio between the signal light and the local oscillation light is a certain intensity ratio determined in advance by the distributor 4 and the signal processing device 8, and is, for example, 9:1.

The demultiplexer 3 is a beam splitter constituted by an optical fiber coupler, a half mirror, a lens, or the like.

The distributor 4 divides the signal light from the demultiplexer 3 into a plurality of signal light beams and outputs the signal light beams. That is, the distributor 4 divides the signal light divided by the demultiplexer 3 and transmitted via an optical fiber cable 10*a* into first to third signal light, and outputs the first to third signal light. The first signal light is input to the first amplifier 5*a* via an optical fiber cable 11*a*, the second signal light is input to the second amplifier 5*b* via an optical fiber cable 11*b*, and the third signal light is input to the third amplifier 5*c* via an optical fiber cable 11*c*.

In a case where the light source 1 outputs laser light having a single wavelength, a temporal dividing means such as an optical switch is used as the distributor 4.

In addition, similarly to the demultiplexer 3, the distributor 4 may be a beam splitter that divides the first to third signal light at a certain intensity ratio and outputs the divided light, the beam splitter being constituted by an optical fiber coupler, a half mirror, a lens, or the like.

Furthermore, the distributor 4 may be a beam splitter that divides the first to third signal light by polarization and outputs divided light.

In a case where the light source 1 outputs laser light having a plurality of mutually different wavelengths, as the distributor 4, means that separates the laser light depending on a wavelength is used.

That is, the distributor 4 selects and divides light beams input from the light source 1 in such a manner that each of the light beams is input to any one of the amplifiers 5*a* to 5*c* capable of amplifying the wavelength of the light beam for each of the wavelengths.

The distributor 4 is constituted by an optical power splitter, an optical switch, a wavelength demultiplexer, or a combination thereof.

Note that the distributor 4 may be the same as the distributor for the light source 1 that outputs laser light having a single wavelength.

The demultiplexer 3 and the distributor 4 constitute the demultiplexer/distributor 2 that receives laser light output from the light source 1 and outputs local oscillation light and a plurality of signal light beams.

The amplifier 5 amplifies the intensity of the signal light divided by the distributor 4. That is, the first signal light divided by the distributor 4 and transmitted via the optical fiber cable 11*a* is amplified by the first amplifier 5*a*. The second signal light divided by the distributor 4 and transmitted via the optical fiber cable 11*b* is amplified by the second amplifier 5*b*. The third signal light divided by the distributor 4 and transmitted via the optical fiber cable 11*c* is amplified by the third amplifier 5*c*.

As the amplifier 5, a solid-state laser amplifier such as an optical fiber amplifier, a waveguide amplifier, or a slab amplifier, or a semiconductor optical amplifier is used.

Since the present LiDAR device uses the plurality of amplifiers as the first amplifier 5*a* to the third amplifier 5*c*, amplifiers different in configuration from each other may be used in combination as the first amplifier 5*a* to the third amplifier 5*c*.

In a case where an LMA fiber is used as the optical fiber cable 12, an LMA fiber amplifier is used as the amplifier 5.

When the LMA fiber is used as the optical fiber cable 12, there is an advantage that high intensity light can be propagated. In particular, in a case where the LMA fiber amplifier is used as the amplifier 5, the number of components can be reduced.

Note that in a case where the LMA amplifier is used as the amplifier 5, the LMA fiber does not have to be necessarily used as the optical fiber cable 12.

In addition, in a case where a solid-state laser amplifier such as a slab amplifier is used as the amplifier 5, and in a case where the intensity of light transmitted through the optical fiber cable 12 is high, an LMA fiber does not have to be necessarily used as the optical fiber cable 12. However, in a case where a loss during transmission is suppressed at the time of high intensity amplification, an LMA fiber is preferably used as the optical fiber cable 12.

The transmission/reception separation device 6 optically couples the amplifier 5 and the light transmission/reception device 7 to each other when the light transmission/reception device 7 emits transmission light, and optically couples the light transmission/reception device 7 and the signal processing device 8 to each other when the light transmission/reception device 7 receives reception light.

That is, the transmission/reception separation device 6 switches an output destination depending on an input source of light, that is, switches the output destination of light to the light transmission/reception device 7 in a case where the input source of light is the amplifier 5, and switches the output destination of light to the signal processing device 8 in a case where the input source of light is the light transmission/reception device 7.

The transmission/reception separation device 6 is an optical circulator including an isolator using a Faraday element and a polarization beam splitter, an optical circulator including a polarization beam splitter and a ¼ wavelength plate, or an optical circulator constituted by a combination thereof.

The first transmission/reception separation device 6*a* outputs the first signal light output from the first amplifier 5*a* and transmitted via the optical fiber cable 12*a* to the light transmission means (free space propagation) 13*a* when transmission light is emitted by the first light transmission/reception device 7*a*, and the first signal light is input to the first light transmission/reception device 7*a*. The first transmission/reception separation device 6*a* outputs the first reception light output from the first light transmission/reception device 7*a* and transmitted via the light transmission means (free space propagation) 13*a* to the optical fiber cable 14*a* when scattered light is received by the first light transmission/reception device 7*a*, and the first reception light is input to the signal processing device 8.

The second transmission/reception separation device 6*b* outputs the second signal light output from the second amplifier 5*b* and transmitted via the optical fiber cable 12*b* to the light transmission means (free space propagation) 13*b* when transmission light is emitted by the second light transmission/reception device 7*b*, and the second signal light is input to the second light transmission/reception device 7*b*. The second transmission/reception separation device 6*b* outputs the second reception light output from the second light transmission/reception device 7*b* and transmitted via the light transmission means (free space propagation) 13*b* to the optical fiber cable 14*b* when scattered light is received by the second light transmission/reception device 7*b*, and the second reception light is input to the signal processing device 8.

The third transmission/reception separation device 6*c* outputs the third signal light output from the third amplifier 5*c* and transmitted via the optical fiber cable 12*c* to the light transmission means (free space propagation) 13*c* when transmission light is emitted by the third light transmission/reception device 7*c*, and the third signal light is input to the third light transmission/reception device 7*c*. The third transmission/reception separation device 6*c* outputs the third reception light output from the third light transmission/reception device 7*c* and transmitted via the light transmission means (free space propagation) 13*c* to the optical fiber cable 14*c* when scattered light is received by the third light transmission/reception device 7*c*, and the third reception light is input to the signal processing device 8.

The light transmission/reception device 7 emits signal light output from the amplifier 5 into space as transmission light and receives scattered light from a measurement target present in space as reception light.

The light transmission/reception device 7 is a so-called optical telescope, and includes an optical antenna including a plurality of refraction lenses or a plurality of mirrors.

The first light transmission/reception device 7*a* is connected to the first transmission/reception separation device 6*a* via the light transmission means (free space propagation) 13*a*, the second light transmission/reception device 7*b* is connected to the second transmission/reception separation device 6*b* via the light transmission means (free space propagation) 13*b*, and the third light transmission/reception device 7*c* is connected to the third transmission/reception separation device 6*c* via the light transmission means (free space propagation) 13*c*.

The first light transmission/reception device 7*a* to the third light transmission/reception device 7*c* are disposed in such a manner that directions in which the first light transmission/reception device 7*a* to the third light transmission/reception device 7*c* emit light are different from each other.

The signal processing device 8 performs analysis on the basis of the reception light from the optical light transmission/reception device 7 and the local oscillation light from the demultiplexer 3, and calculates a distance to a measurement target present in space and a property of the measurement target.

That is, the signal processing device 8 performs analysis on the basis of the first reception light based on the scattered light from the measurement target received by the first light transmission/reception device 7*a*, the first reception light being input via the light transmission means (free space propagation) 13*a*, the first transmission/reception separation device 6*a*, and the optical fiber cable 14*a*, and the local oscillation light input from the demultiplexer 3 via the optical fiber cable 10*b*, and calculates the distance to the measurement target and the property of the measurement target.

Similarly, the signal processing device 8 performs analysis on the basis of the second reception light based on the scattered light from the measurement target received by the second light transmission/reception device 7*b*, the second reception light being input via the light transmission means (free space propagation) 13*b*, the second transmission/reception separation device 6*b*, and the optical fiber cable 14*b*, and the local oscillation light input from the demultiplexer 3 via the optical fiber cable 10*b*, and calculates the distance to the measurement target and the property of the measurement target.

Furthermore, the signal processing device 8 performs analysis on the basis of the third reception light based on the scattered light from the measurement target received by the third light transmission/reception device 7*c*, the third reception light being input via the light transmission means (free space propagation) 13*c*, the third transmission/reception separation device 6*c*, and the optical fiber cable 14*c*, and the local oscillation light input from the demultiplexer 3 via the optical fiber cable 10*b*, and calculates the distance to the measurement target and the property of the measurement target.

In a case where a wind measurement Doppler LiDAR device that measures a wind speed is used as the LiDAR device, the signal processing device 8 includes a heterodyne receiver, an A/D converter, a fast Fourier transform device, a frequency shift analysis device, and a speed calculation device.

The heterodyne receiver causes the local oscillation light from the demultiplexer 3 and the reception light from the transmission/reception separation device 6 to interfere with each other, and detects a signal with a balanced detector, that is, executes heterodyne detection.

The A/D converter converts an analog electrical signal converted by the heterodyne receiver into a digital electrical signal.

The fast Fourier transform device performs a fast Fourier transform (FFT) on the digital electrical signal from the A/D converter.

The frequency shift analysis device obtains a Doppler shift amount of the scattered light by calculating a peak frequency from a signal spectrum Fourier-transformed by the fast Fourier transform device.

The speed calculation device calculates a speed of the measurement target from the Doppler shift amount obtained by the frequency shift analysis device.

The fast Fourier transform device, the frequency shift analysis device, and the speed calculation device each include a central processing unit (CPU) and a memory. The CPU executes a program stored in the memory, and the speed of the measurement target is thereby calculated.

Although the signal processing device 8 has been described above as a device that performs processing using heterodyne detection, processing using a detection method other than heterodyne, such as video detection, may be performed.

Next, an operation will be described.

An operation of transmitting transmission light into space where a measurement target is present will be described.

There is no difference in operation between a case where the light source 1 outputs laser light having a single wavelength and a case where the light source 1 outputs laser light having a plurality of mutually different wavelengths.

Laser light output from the light source 1 every unit time is demultiplexed by the demultiplexer 3, and the demultiplexed signal light is transmitted to the distributor 4 via the optical fiber cable 10*a*.

From the distributor 4, the first signal light is sequentially transmitted to the first amplifier 5*a* via the optical fiber cable 11*a*, the second signal light is sequentially transmitted to the second amplifier 5*b* via the optical fiber cable 11*b*, and the third signal light is sequentially transmitted to the third amplifier 5*c* via the optical fiber cable 11*c*.

The amplifier 5 that has received the signal light divided by the distributor 4 amplifies the signal light, and the amplified signal light is transmitted to the transmission/reception separation device 6 via the optical fiber cable 12.

The transmission/reception separation device 6 outputs the signal light amplified by the amplifier 5 and propagated through the optical fiber cable 12 to the light transmission means (free space propagation) 13 in such a manner that the signal light is input to the light transmission/reception device 7.

That is, the first transmission/reception separation device 6*a* outputs the first signal light amplified by the first amplifier 5*a* and propagated through the optical fiber cable 12*a* to the light transmission means (free space propagation) 13*a* in such a manner that the first signal light is input to the first light transmission/reception device 7*a*.

The second transmission/reception separation device 6*b* outputs the second signal light amplified by the second amplifier 5*b* and propagated through the optical fiber cable 12*b* to the light transmission means (free space propagation) 13*b* in such a manner that the second signal light is input to the second light transmission/reception device 7*b*.

The third transmission/reception separation device 6*c* outputs the third signal light amplified by the third amplifier 5*c* and propagated through the optical fiber cable 12*c* to the light transmission means (free space propagation) 13*c* in such a manner that the third signal light is input to the third light transmission/reception device 7*c*.

The light transmission/reception device 7 emits the signal light input via the light transmission means 13 into space as transmission light.

That is, the first light transmission/reception device 7*a* emits first transmission light, the second light transmission/reception device 7*b* emits second transmission light, and the third light transmission/reception device 7*c* emits third transmission light.

In this way, the first transmission light, the second transmission light, and the third transmission light are emitted from the first light transmission/reception device 7*a*, from the second light transmission/reception device 7*b*, and from the third light transmission/reception device 7*c*, respectively, in different directions in space.

Meanwhile, the transmission light is scattered by the measurement target. The scattered light is collected by the light transmission/reception device 7 and transmitted as reception light to the transmission/reception separation device 6 via the light transmission means (free space propagation) 13.

The transmission/reception separation device 6 outputs the reception light propagated through the light transmission means (free space propagation) 13 from the light transmission/reception device 7 to the optical fiber cable 14 in such a manner that the reception light is input to the signal processing device 8.

That is, the first transmission/reception separation device 6*a* outputs the first reception light propagated through the light transmission means (free space propagation) 13*a* from the first light transmission/reception device 7*a* to the optical fiber cable 14*a* in such a manner that the first reception light is input to the signal processing device 8.

The second transmission/reception separation device 6*b* outputs the second reception light propagated through the light transmission means (free space propagation) 13*b* from the second light transmission/reception device 7*b* to the optical fiber cable 14*b* in such a manner that the second reception light is input to the signal processing device 8.

The third transmission/reception separation device 6*c* outputs the third reception light propagated through the light transmission means (free space propagation) 13*c* from the third light transmission/reception device 7*c* to the optical fiber cable 14*c* in such a manner that the third reception light is input to the signal processing device 8.

The signal processing device 8 performs analysis on the basis of the reception light transmitted via the optical fiber cable 14, the transmission/reception separation device 6, and the light transmission means (free space propagation) 13 from the light transmission/reception device 7, and the local oscillation light transmitted via the optical fiber cable 10*b* from the demultiplexer 3, and calculates the distance to the measurement target present in space and the property of the measurement target.

As described above, in the LiDAR configuration in which the plurality of light transmission/reception devices and switching of an irradiation direction by an optical switch are combined, measurement in a plurality of directions can be implemented while a device size and cost are suppressed and reliability is maintained, whereas the SN ratio is decreased due to scattering in the optical switch. However, in the LiDAR device according to the first embodiment, the corresponding amplifiers 5*a* to 5*c* and the corresponding transmission/reception separation devices 6*a* to 6*c* are disposed for the plurality of light transmission/reception devices 7*a* to 7*c*, respectively, and the distributor 4 that outputs the signal light to each of the light transmission/reception devices 7*a* to 7*c* is disposed in a preceding stage of the amplifiers 5*a* to 5*c*. Therefore, in the reception system from the light transmission/reception devices 7*a* to 7*c* through the transmission/reception separation devices 6*a* to 6*c* to the signal processing device 8, there is no possibility that backscattered light generated by scattering of the signal light by the distributor 4 is mixed, and the backscattered light is not input to the signal processing device 8. Therefore, the deterioration in the SN ratio of the reception signal can be suppressed.

In addition, in a case where the optical switch and the amplifier are used, when the backscattered light generated by the optical switch is incident on the amplifier, energy of the amplifier is consumed by amplification of the backscattered light, and a ratio of energy used for amplification of transmission light decreases.

However, in the LiDAR device according to the first embodiment, since the distributor 4 is disposed in a preceding stage of the amplifiers 5*a* to 5*c*, the backscattered light generated by the distributor 4 is not input to the amplifiers 5*a* to 5*c*, and an amplification factor in each of the amplifiers 5*a* to 5*c* can be maintained to be high.

Furthermore, it is possible to maintain a light intensity input to the distributor 4 to be small, and it is possible to use an optical switch having low light resistance as the distributor 4 while maintaining a high output intensity.

Second Embodiment

A LiDAR device according to a second embodiment will be described with reference to FIG. 2.

Figure 2:
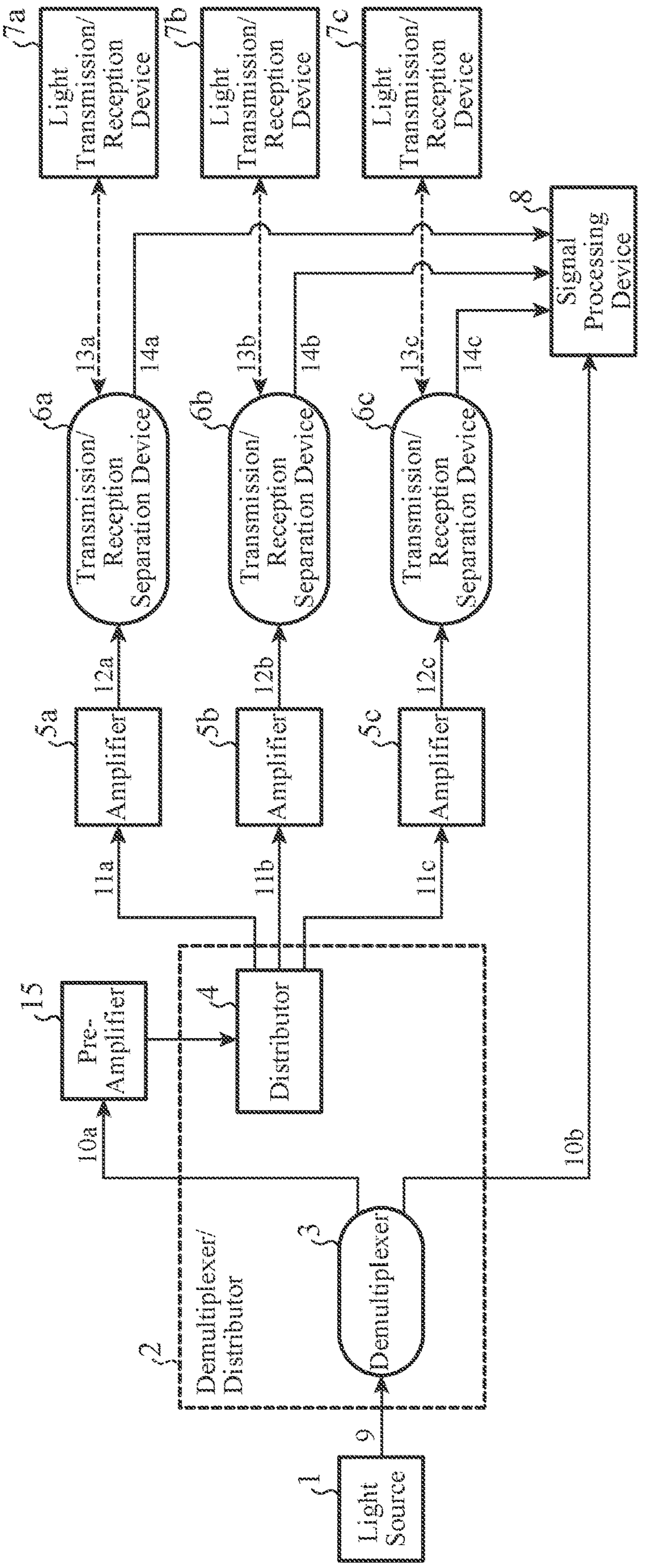
FIG. 2 is a configuration diagram illustrating a LiDAR device according to a second embodiment.

In FIG. 2, the same reference numerals as in FIG. 1 denote the same or corresponding portions.

The LiDAR device according to the second embodiment is different from the LiDAR device according to the first embodiment in that a pre-amplifier 15 that amplifies signal light divided by a demultiplexer 3 is disposed between the demultiplexer 3 and a distributor 4 constituting a demultiplexer/distributor 2.

Also in the LiDAR device according to the second embodiment, similar effects to those of the LiDAR device according to the first embodiment can be obtained.

Moreover, by disposing the pre-amplifier 15, an influence of disturbance and attenuation associated with propagation can be suppressed, and a stable amplification factor can be obtained and an SN ratio can be improved in amplifiers 5*a* to 5*c*.

Third Embodiment

A LiDAR device according to a third embodiment will be described with reference to FIG. 3.

Figure 3:
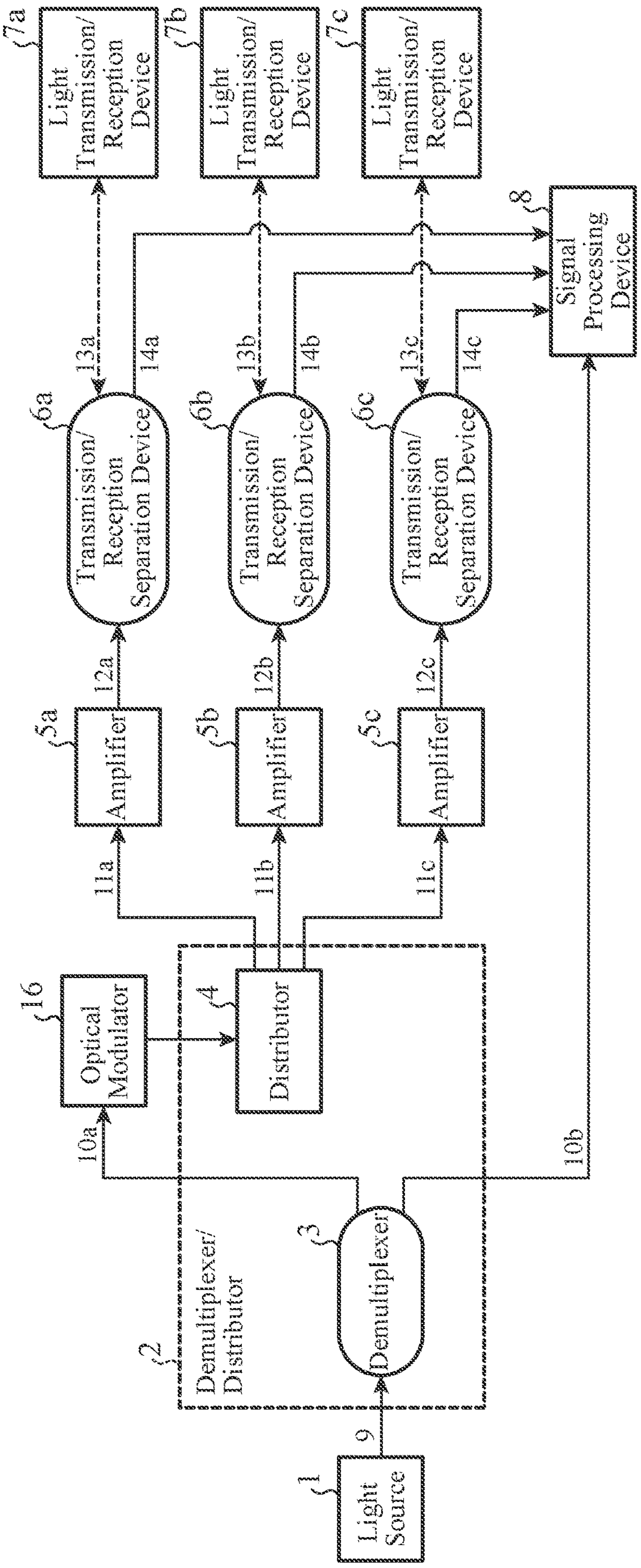
FIG. 3 is a configuration diagram illustrating a LiDAR device according to a third embodiment.

In FIG. 3, the same reference numerals as in FIG. 1 denote the same or corresponding portions.

The LiDAR device according to the third embodiment is different from the LiDAR device according to the first embodiment in that an optical modulator 16 is disposed between a demultiplexer 3 and a distributor 4 constituting a demultiplexer/distributor 2. The optical modulator 16 is, for example, a lithium niobate (LN, $LiNbO_3$) modulator that temporally applies optical modulation to signal light divided by the demultiplexer 3.

Also in the LiDAR device according to the third embodiment, similar effects to those of the LiDAR device according to the first embodiment can be obtained.

Moreover, by disposing the optical modulator 16, first, high peak energy is obtained by pulsing and an SN ratio is improved, and second, heterodyne detection can be used by frequency modulation.

Fourth Embodiment

A LiDAR device according to a fourth embodiment will be described with reference to FIGS. 4 and 5.

Figure 4:
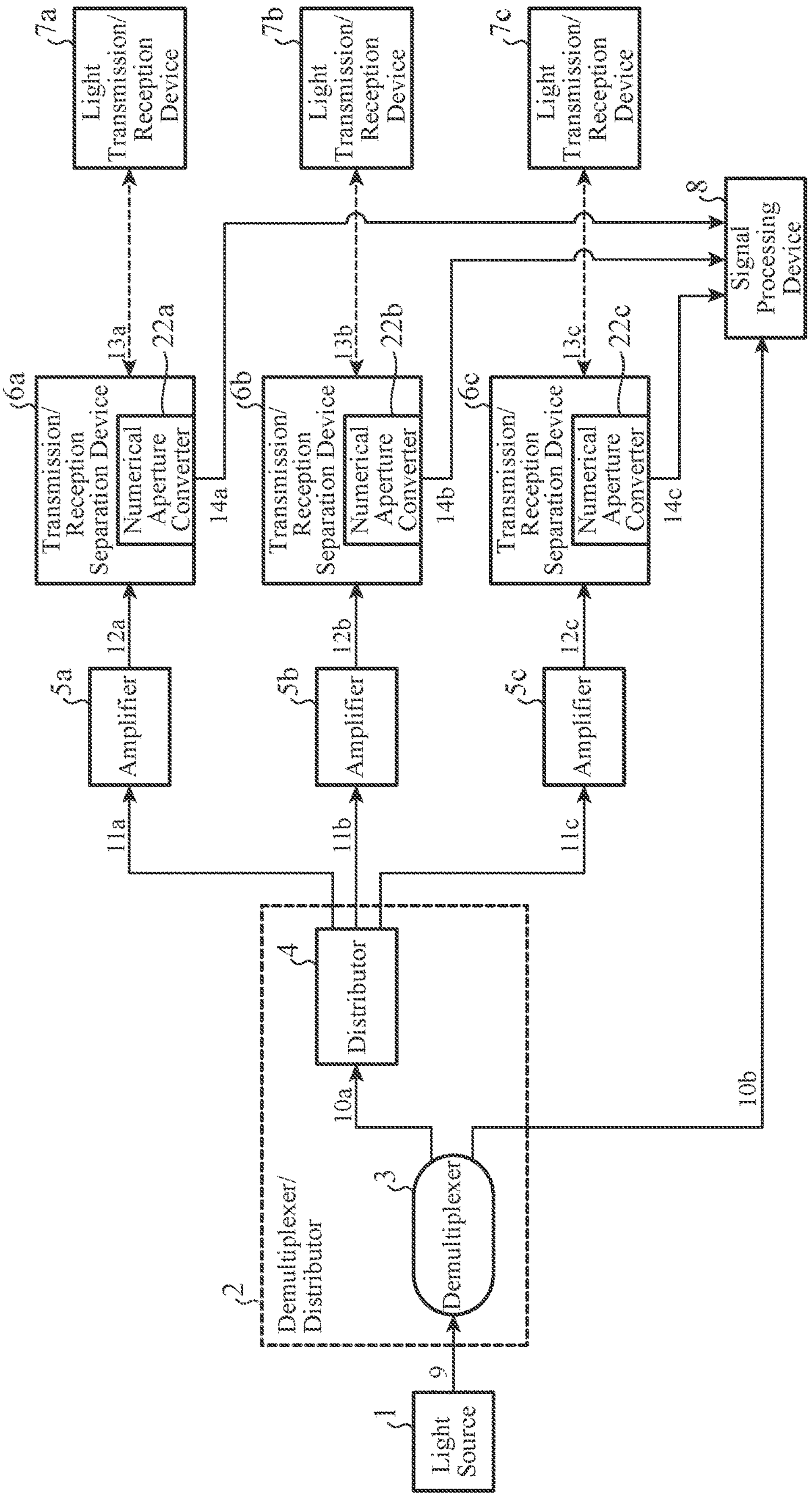
FIG. 4 is a configuration diagram illustrating a LiDAR device according to a fourth embodiment.
Figure 5:
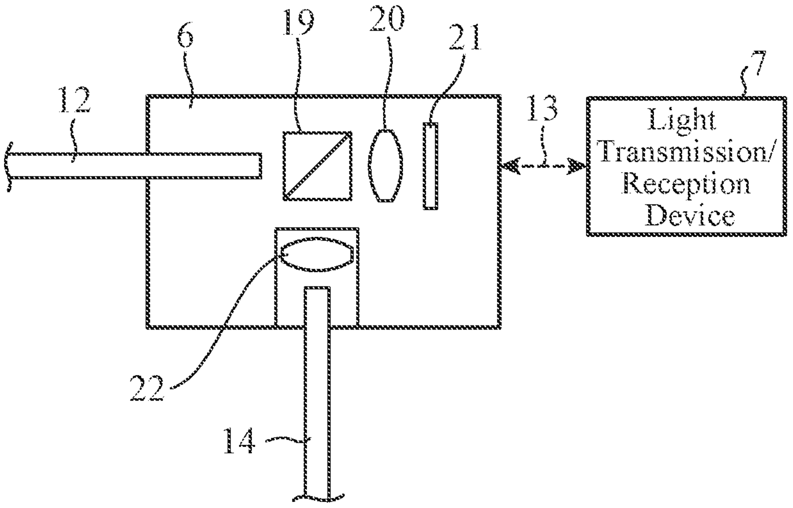
FIG. 5 is a configuration diagram illustrating a transmission/reception separation device in the LiDAR device according to the fourth embodiment.

In FIGS. 4 and 5, the same reference numerals as in FIG. 1 denote the same or corresponding portions.

The LiDAR device according to the fourth embodiment is different from the LiDAR device according to the first embodiment in that a transmission/reception separation device 6 includes a numerical aperture converter 22, and in that by using the transmission/reception separation device 6 including the numerical aperture converter 22, an optical fiber cable using an LMA fiber is specified as an optical fiber cable 12 that optically couples the amplifier 5 and the transmission/reception separation device 6 to each other.

Other configuration requirements of the LiDAR device according to the fourth embodiment are similar to the configuration requirements of the LiDAR device according to the first embodiment.

Specifically, a light source 1, a demultiplexer 3, a distributor 4, a plurality of light transmission/reception devices 7, and a signal processing device 8 in the LiDAR device according to the fourth embodiment are the same as the light source 1, the demultiplexer 3, the distributor 4, the plurality of light transmission/reception devices 7, and the signal processing device 8 in the LiDAR device according to the first embodiment.

The LiDAR device according to the fourth embodiment specifies an optical fiber cable using an LMA fiber as the optical fiber cable 12 that optically couples the amplifier 5 and the transmission/reception separation device 6 to each other, and therefore can suppress occurrence of a nonlinear phenomenon due to an optical transmission medium in a section where a light intensity is the largest and an intensity density is the largest from the amplifier 5 to the transmission/reception separation device 6, in particular, occurrence of an optical loss during transmission by induction Brillouin scattering.

As the amplifier 5, for example, a solid-state laser amplifier such as an LMA fiber amplifier or a slab amplifier is used.

In addition, since the optical fiber cable 14 that optically couples the transmission/reception separation device 6 and the signal processing device 8 to each other only needs to have a relatively low strength as optical transmission, cost can be reduced by using an optical fiber cable using a normal optical fiber that is not an LMA fiber, that is, an optical fiber having a smaller effective cross-sectional area for a basic mode than the LMA fiber.

As the optical fiber cable 14, an LMA fiber may be used depending on a required level of beam quality or a required cost.

Similarly, cost can be reduced by using an optical fiber cable using a normal optical fiber as the optical fiber cable 9 that optically couples the light source 1 and the demultiplexer 3 to each other, the optical fiber cable 10*a* that optically couples the demultiplexer 3 and the distributor 4 to each other, the optical fiber cable 10*b* that optically couples the demultiplexer 3 and the signal processing device 8 to each other, and an optical fiber cable 11 that optically couples the distributor 4 and the amplifier 5 to each other, each of which only needs to have a relatively low intensity as optical transmission.

An LMA fiber may be used for the optical fiber cables 10*a*, 10*b*, 11, and 14 depending on a required level of beam quality or a required cost.

Note that the transmission/reception separation device 6 and the light transmission/reception device 7 are optically coupled to each other by free space propagation (light transmission means 13).

The LMA fiber used for the optical fiber cable 12 and the normal optical fiber used for the optical fiber cable 14 are light transmission means having different effective cross-sectional areas for a basic mode, that is, different numerical apertures.

Therefore, the transmission/reception separation device 6 includes: a separator having a signal light-based optical path that outputs the signal light propagated through the optical fiber cable 12 from the amplifier 5 to the light transmission means (free space propagation) 13 in such a manner that the signal light is input to the light transmission/reception device 7, and a reception light-based optical path that outputs the reception light propagated through the light transmission means (free space propagation) 13 from the light transmission/reception device 7 to the optical fiber cable 14 in such a manner that the reception light is input to the signal processing device 8; and the numerical aperture converter 22 that performs different numerical aperture conversion between the signal light-based optical path and the reception light-based optical path with the separator.

That is, as illustrated in FIG. 5, the transmission/reception separation device 6 is an optical circulator including a polarization beam splitter (PBS) 19, a lens 20, a ¼ λ wavelength plate 21, and the numerical aperture converter 22.

The polarization beam splitter 19, the lens 20, and the ¼ λ wavelength plate 21 constitute a separator having the signal light-based optical path that outputs signal light amplified by the corresponding amplifier 5 and propagated through the optical fiber cable 12 to the light transmission means 13 in such a manner that the signal light is input to the corresponding light transmission/reception device 7, and the reception light-based optical path that outputs reception light propagated through the light transmission means 13 from the corresponding light transmission/reception device 7 to the optical fiber cable 14 in such a manner that the reception light is input to the signal processing device 8.

One end of the optical fiber cable 12 is optically coupled to the polarization beam splitter 19.

One end of the optical fiber cable 14 is optically coupled to the numerical aperture converter 22.

The polarization beam splitter 19, the lens 20, and the ¼ λ wavelength plate 21 constituting the separator mutually convert the numerical aperture of the optical fiber cable 12 and the numerical aperture of the light transmission/reception device 7.

That is, in the signal light-based optical path of the transmission/reception separation device 6, the signal light propagated through the optical fiber cable 12 is output to the light transmission means 13 while the numerical aperture of the optical fiber cable 12 that is an LMA fiber is converted to the numerical aperture of the light transmission/reception device 7 by the polarization beam splitter 19, the lens 20, and the ¼ λ wavelength plate 21.

Meanwhile, in the reception light-based optical path of the transmission/reception separation device 6, the reception light propagated through the light transmission means 13 from the light transmission/reception device 7 is output to the optical fiber cable 14 in such a manner that the reception light is input to the signal processing device 8 while the numerical aperture of the light transmission/reception device 7 is converted to the numerical aperture of the LMA fiber by the ¼ λ wavelength plate 21, the lens 20, and the polarization beam splitter 19, and the numerical aperture of the LMA fiber is further converted to the numerical aperture of the optical fiber cable 14 that is a normal optical fiber by the numerical aperture converter 22.

The numerical aperture converter 22 is a numerical aperture conversion lens.

Therefore, by the transmission/reception separation device 6, the signal light propagated through the optical fiber cable 12 is output to the light transmission means 13 in such a manner that the signal light is input to the light transmission/reception device 7 while the numerical aperture of the optical fiber cable 12 which is an LMA fiber is converted to the numerical aperture of the light transmission/reception device 7 through the polarization beam splitter 19, the lens 20, and the ¼ λ wavelength plate 21.

In addition, by the optical transmission/reception separation device 6, when the light transmission/reception device 7 receives the reception light, the reception light propagated via the light transmission means 13 from the light transmission/reception device 7 is output to the optical fiber cable 14 in such a manner that the reception light is input to the signal processing device 8 while the numerical aperture of the light transmission/reception device 7 is converted to the numerical aperture of the LMA fiber and the numerical aperture of the LMA fiber is converted to the numerical aperture of the optical fiber cable 14 which is a normal optical fiber via the ¼ λ wavelength plate 21, the lens 20, the polarization beam splitter 19, and the numerical aperture converter 22.

Next, an operation will be described.

Since a basic operation is the same as that of the LiDAR device described in the first embodiment, an operation of the transmission/reception separation device 6 will be mainly described.

The signal light amplified by the amplifier and propagated through the optical fiber cable is output to the light transmission means 13 in such a manner that the signal light is input to the light transmission/reception device 7 while the numerical aperture of the optical fiber cable 12 which is an LMA fiber is converted to the numerical aperture of the light transmission/reception device 7 by the polarization beam splitter 19, the lens 20, and the ¼λ wavelength plate 21 in the transmission/reception separation device 6.

Meanwhile, when the light transmission/reception device 7 receives the reception light, the reception light propagated through the light transmission means 13 from the light transmission/reception device 7 is output to the optical fiber cable 14 in such a manner that the reception light is input to the signal processing device 8 while the numerical aperture of the light transmission/reception device 7 is converted to the numerical aperture of the LMA fiber by the ¼ λ wavelength plate 21, the lens 20, and the polarization beam splitter 19, and the numerical aperture of the LMA fiber is converted to the numerical aperture of the optical fiber cable 14 which is a normal optical fiber by the numerical aperture converter 22.

As described above, also in the LiDAR device according to the fourth embodiment, similar effects to those of the LiDAR device according to the first embodiment can be obtained. In addition, since an LMA fiber is used as the optical fiber cable 12, it is possible to suppress occurrence of an optical loss during transmission of the optical signal from the amplifier 5 to the transmission/reception separation device 6, and since the transmission/reception separation device 6 performs different numerical aperture conversion between transmission light and reception light, it is possible to prevent an optical loss due to inconsistency in the numerical aperture when the transmission light is input to the transmission/reception separation device 6 and when the reception light is input to the optical fiber cable 14. As a result, a decrease in an SN ratio can be suppressed.

In addition, due to a difference in numerical aperture between the optical fiber cable 12 and the optical fiber cable 14, it is possible to prevent an optical loss due to inconsistency in numerical aperture when the transmission light is input to the transmission/reception separation device 6 and when the reception light is input to the optical fiber cable 14.

Furthermore, by disposing the numerical aperture converter 22 in the transmission/reception separation device 6, it is possible to combine the light transmission/reception devices 7*a* to 7*c*, the light transmission means 9 to 12 and 14, and the amplifiers 5*a* to 5*c* having various numerical apertures while suppressing the number of components, and the degree of freedom in design is improved.

Note that, in the LiDAR device according to the fourth embodiment, the numerical aperture converter 22 is disposed between the polarization beam splitter 19 and the optical fiber cable 14, but the numerical aperture converter 22 may be disposed between the optical fiber cable 12 and the polarization beam splitter 19.

In this case, the numerical aperture converter 22 is a numerical aperture conversion lens that converts the numerical aperture of the optical fiber cable 12 which is an LMA fiber to the numerical aperture of the light transmission/reception device 7.

Alternatively, the numerical aperture converters 22 may be disposed between the polarization beam splitter 19 and the optical fiber cable 14 and between the optical fiber cable 12 and the polarization beam splitter 19.

In this case, the numerical aperture converter 22 disposed between the optical fiber cable 12 and the polarization beam splitter 19 is a numerical aperture conversion lens that converts the numerical aperture of the optical fiber cable 12 that is an LMA fiber to the numerical aperture of the light transmission/reception device 7, and the numerical aperture converter 22 disposed between the polarization beam splitter 19 and the optical fiber cable 14 is a numerical aperture conversion lens that converts the numerical aperture of the light transmission/reception device 7 to the numerical aperture of the optical fiber cable 14 that is a normal optical fiber.

Furthermore, the first light transmission/reception device 7*a* to the third light transmission/reception device 7*c* may be light transmission/reception devices having mutually different numerical apertures, and appropriate resolution can be provided depending on a measurement distance.

Fifth Embodiment

A LiDAR device according to a fifth embodiment will be described with reference to FIG. 6.

Figure 6:
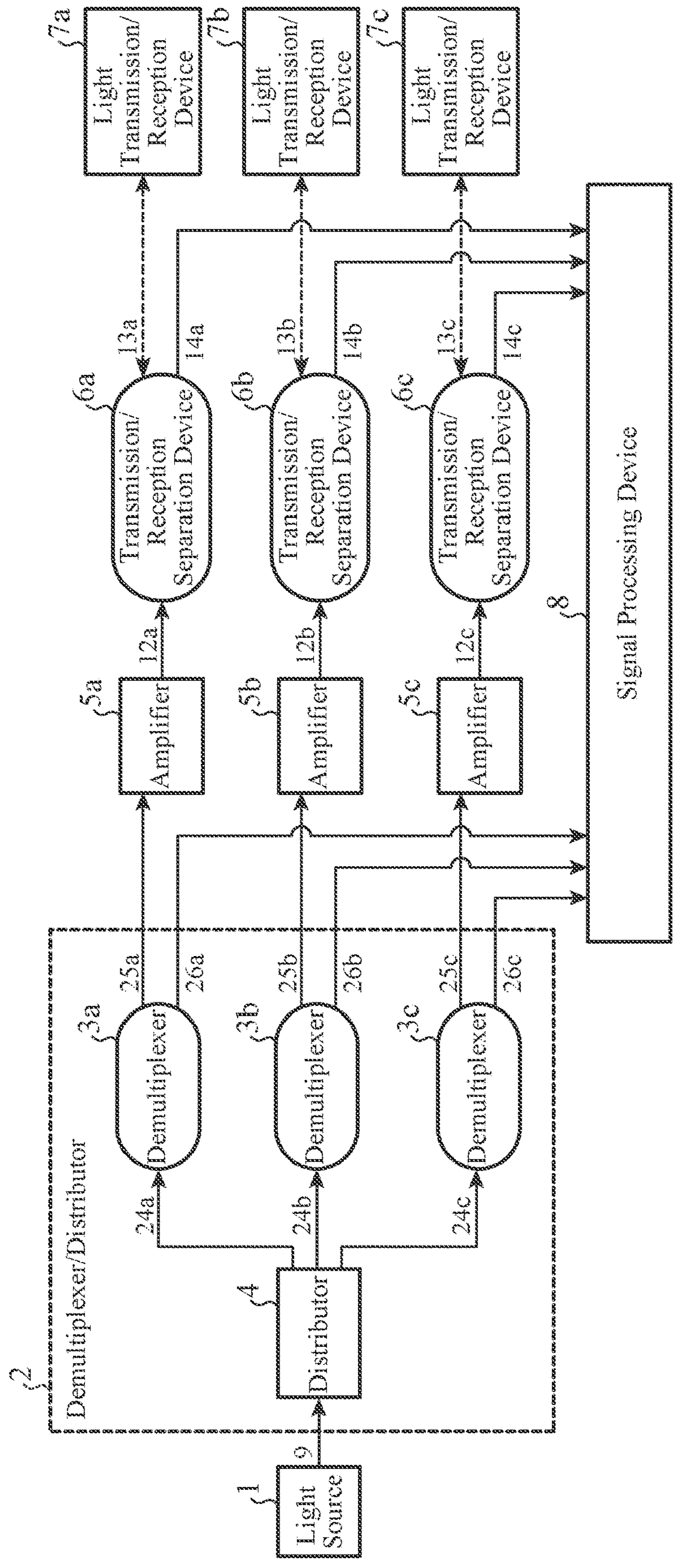
FIG. 6 is a configuration diagram illustrating a LiDAR device according to a fifth embodiment.

In FIG. 6, the same reference numerals as in FIG. 1 denote the same or corresponding portions.

The LiDAR device according to the fifth embodiment is different from the LiDAR device according to the first embodiment in that the demultiplexer 3 and the distributor 4 constituting the demultiplexer/distributor 2 are optically coupled to each other by the optical fiber cable 10*a* in order of the demultiplexer 3 and the distributor 4 in the LiDAR device according to the first embodiment, whereas a demultiplexer 3 and a distributor 4 constituting a demultiplexer/distributor 2 are optically coupled to each other by an optical fiber cable 24 in order of the distributor 4 and a plurality of the demultiplexers 3 in the LiDAR device according to the fifth embodiment.

The demultiplexer/distributor 2 receives laser light output from a light source 1 and outputs local oscillation light and a plurality of signal light beams similarly to the demultiplexer/distributor 2 in the LiDAR device according to the first embodiment.

The distributor 4 constituting the demultiplexer/distributor 2 divides the laser light output from the light source 1 and transmitted via an optical fiber cable 9 into a plurality of laser light beams and outputs the laser light beams. That is, the distributor 4 divides the laser light transmitted via the optical fiber cable 9 into first to third laser light, and outputs the first to third laser light. The first laser light is input to a first demultiplexer 3*a* via an optical fiber cable 24*a*, the second laser light is input to a second demultiplexer 3*b* via an optical fiber cable 24*b*, and the third laser light is input to a third demultiplexer 3*c* via an optical fiber cable 24*c*.

The distributor 4 is a distributor similar to the distributor 4 in the LiDAR device according to the first embodiment.

The demultiplexer 3 constituting the demultiplexer/distributor 2 divides the laser light divided by and output from the distributor 4 into local oscillation light and signal light. A division ratio between the signal light and the local oscillation light is, for example, 9:1.

The first demultiplexer 3*a* divides the first laser light divided by the distributor 4 and transmitted via the optical fiber cable 24*a* into first signal light and first local oscillation light. The first signal light is input to a first amplifier 5*a* via an optical fiber cable 25*a*, and the first local oscillation light is input to a signal processing device 8 via an optical fiber cable 26*a*.

The second demultiplexer 3*b* divides the second laser light divided by the distributor 4 and transmitted via the optical fiber cable 24*b* into second signal light and second local oscillation light. The second signal light is input to a second amplifier 5*b* via an optical fiber cable 25*b*, and the second local oscillation light is input to the signal processing device 8 via an optical fiber cable 26*b*.

The third demultiplexer 3*c* divides the third laser light divided by the distributor 4 and transmitted via the optical fiber cable 24*c* into third signal light and third local oscillation light. The third signal light is input to a third amplifier 5*c* via an optical fiber cable 25*c*, and the third local oscillation light is input to the signal processing device 8 via an optical fiber cable 26*c*.

The first demultiplexer 3*a* to the third demultiplexer 3*c* are similar to the demultiplexer 3 in the LiDAR device according to the first embodiment.

In a transmission mode, the signal processing device 8 operates similarly to the signal processing device 8 in the LiDAR device according to the first embodiment. In a reception mode, the signal processing device 8 performs analysis on the basis of the first reception light based on scattered light from a measurement target received by the first light transmission/reception device 7*a* and the first local oscillation light from the first demultiplexer 3*a*, performs analysis on the basis of the second reception light based on scattered light from the measurement target received by the second light transmission/reception device 7*b* and the second local oscillation light from the second demultiplexer 3*b*, performs analysis on the basis of the third reception light based on scattered light from the measurement target received by the third light transmission/reception device 7*c* and the third local oscillation light from the third demultiplexer 3*c*, and calculates a distance to a measurement target and a property of the measurement target.

Also in the LiDAR device according to the fifth embodiment, similar effects to those of the LiDAR device according to the first embodiment can be obtained.

In the demultiplexer/distributor 2, since the distributor 4 and each of the first demultiplexer 3*a* to the third demultiplexer 3*c* are disposed in this order, mechanical arrangement in the LiDAR device is flexible.

Note that, in the LiDAR device according to the fifth embodiment, the first to third laser light divided by the distributor 4 is obtained by simple intensity division. Therefore, the first amplifier 5*a* to the third amplifier 5*c* may simultaneously and in parallel amplify the first to third signal light demultiplexed by the first demultiplexer 3*a* to the third demultiplexer 3*c*, respectively, the signal processing device 8 may include a first signal processing device that performs analysis on the basis of the first reception light and the first local oscillation light, a second signal processing device that performs analysis on the basis of the second reception light and the second local oscillation light, and a third signal processing device that performs analysis on the basis of the third reception light and the third local oscillation light, and the first to third signal processing devices may perform analysis simultaneously and in parallel and may calculate the distance to the measurement target and the property of the measurement target.

With such a configuration, there is an advantage that the first light transmission/reception device 7*a* to the third light transmission/reception device 7*c* can simultaneously perform measurement with the same wavelength in a plurality of different directions.

Note that the signal divided by the distributor 4 is not limited to the three signal light beams, the first signal light to the third signal light, and may be two signal light beams or four or more signal light beams. In this case, it is only required to dispose the signal processing devices 8 corresponding to the plurality of signal light beams, respectively.

Sixth Embodiment

A LiDAR device according to a sixth embodiment will be described with reference to FIG. 7.

Figure 7:
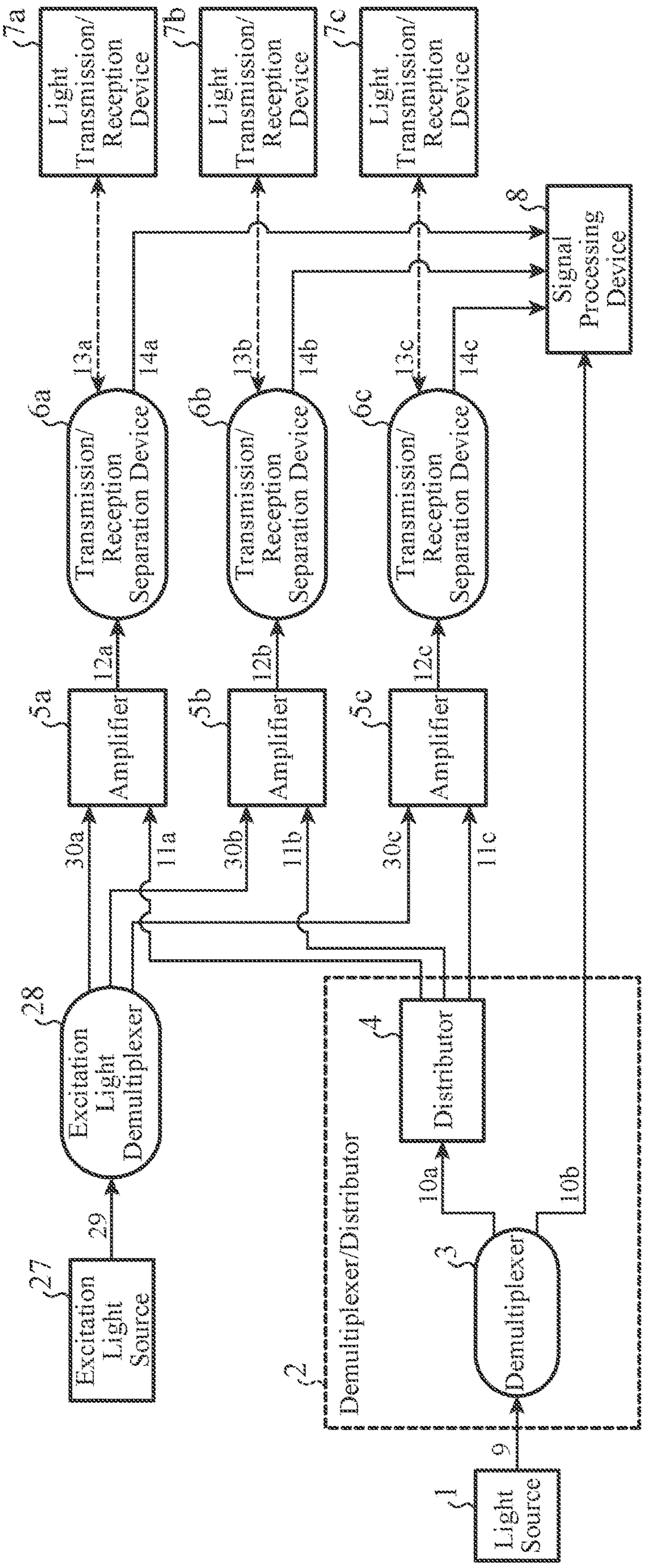
FIG. 7 is a configuration diagram illustrating a LiDAR device according to a sixth embodiment.

In FIG. 7, the same reference numerals as in FIG. 1 denote the same or corresponding portions.

The LiDAR device according to the sixth embodiment is different from the LiDAR device according to the first embodiment in that one excitation light source 27 and an excitation light demultiplexer 28 that branches output light from the excitation light source 27 are disposed, and each amplifier 5 is excited by excitation light branched from the excitation light demultiplexer 28.

In addition, in the LiDAR device according to the sixth embodiment, in particular, description will be given of a device using an erbium ion-doped fiber amplifier (hereinafter, referred to as EDFA) as the amplifier 5 and using a cascade Raman fiber laser (hereinafter, referred to as CRFL) as the excitation light source 27 for applying excitation light to the amplifier 5.

The cascade Raman fiber laser which is the excitation light source 27 is alight source that outputs single-mode laser light in a 1.48 μm band.

The EDFA has a wide gain in a 1.5 μm band and is most efficiently excited by light of 1.48 μm.

Therefore, when laser light output from a light source 1 is demultiplexed by a demultiplexer 3 and when signal light divided by a distributor 4 is in a 1.5 μm band, signal light in an eye safe band can be amplified with high intensity and high efficiency by using the EDFA for the amplifier 5 and using the CRFL for the excitation light source 27.

Note that, in a case of aiming at high output as the amplifier 5, an LMA fiber type erbium ion-doped fiber amplifier (LMA-EDFA) is preferably used as the amplifier 5.

The laser light output from the excitation light source 27 is divided into a plurality of excitation light beams by the excitation light demultiplexer 28, and the divided excitation light beams are input to the amplifier 5.

That is, the excitation light demultiplexer 28 divides the laser light transmitted via an optical fiber cable 29 and output from the excitation light source 27 into first to third excitation light, and outputs the first to third excitation light.

The first excitation light is input to a first amplifier 5*a* via an optical fiber cable 30*a*, the second excitation light is input to a second amplifier 5*b* via an optical fiber cable 30*b*, and the third excitation light is input to a third amplifier 5*c* via an optical fiber cable 30*c*.

The division of the excitation light in the excitation light demultiplexer 28 may be a simple branch of dividing into equal intensities, and control may be performed in such a manner that the amplifier 5 is excited when signal light is input to the amplifier 5 in synchronization with the distributor 4.

In the LiDAR device according to the sixth embodiment, a basic operation except for amplifying signal light in a 1.5 μm band with high intensity using an EDFA for the amplifier 5 and using a CRFL for the excitation light source 27 is similar to the operation in the LiDAR device according to the first embodiment, and thus description thereof is omitted.

As described above, the LiDAR device according to the sixth embodiment makes excitation light from the excitation light source 27 common to the plurality of amplifiers 5 by using the excitation light demultiplexer 28, and therefore can suppress the cost and size of the LiDAR device.

In addition, the LiDAR device according to the sixth embodiment can perform a high-output operation outdoors because signal light from the light source 1 is in a 1.5 μm band which is an eye safe band and an EDFA capable of amplifying the 1.5 μm band is used for the amplifier 5.

Furthermore, in the LiDAR device according to the sixth embodiment, the signal light from the light source 1 is in a 1.5 μm band, an EDFA is used for the amplifier 5, and excitation light from the excitation light source 27 is common to the plurality of amplifiers 5 using the excitation light demultiplexer 28. Therefore, even in a case w % here a CRFL which is the excitation light source 27 in a 1.48 μm band is used for excitation of the EDFA, a high-output operation can be performed outdoors, the amplifier 5 can perform amplification with high efficiency, and the cost and size of the LiDAR device can be suppressed.

Note that, also in the LiDAR device according to the sixth embodiment, similar effects to those of the LiDAR device according to the first embodiment can be obtained.

That is, first, since excitation light from the single excitation light source 27 is branched by the excitation light demultiplexer 28, and the branched excitation light beams are input to the plurality of amplifiers 5, respectively, the cost and size of the LiDAR device can be suppressed.

Second, by using signal light in an eye safe band as the signal light from the light source 1 and using an EDFA for the amplifier 5, a high-output operation can be safely performed outdoors.

Third, by using signal light in an eye safe band as the signal light from the light source 1, using an EDFA for the amplifier 5, and using the excitation light source 27 which is a CRFL in a 1.48 μm band in combination with the EDFA, signal light in a 1.5 μm band can be subjected to high-output operation as a device capability by high-efficiency excitation.

Fourth, signal light in an eye safe band is used as the signal light from the light source 1, the excitation light source 27 which is a CRFL is used in combination with the amplifier 5 which is an EDFA, and laser light output from the excitation light source 27 is divided into a plurality of excitation light beams by the excitation light demultiplexer 28 and input to the plurality of amplifiers 5*a* to 5*c*, respectively. As a result, the excitation light source 27 can be made common to the plurality of amplifiers 5*a* to 5*c*, that is, the excitation light source 27 can be made single. Therefore, a LiDAR device that can be used outdoors and can amplify the signal light in an eye safe band with high output and high efficiency can be obtained by reducing the cost and size.

In short, even in a case where a CRFL that changes a wavelength of laser light such as a ytterbium ion-doped fiber laser (YDFL) by stimulated Raman scattering and outputs high-cost single mode laser light in a 1.48 μm band having a multi-step structure is used as the excitation light source 27, the excitation light source 27 can be made common to the plurality of amplifiers 5*a* to 5*c*, that is, the excitation light source 27 can be made single by using the excitation light demultiplexer 28. Therefore, the cost and size of the excitation light source 27 can be reduced, and the size and the cost of the LiDAR device can be reduced.

Note that, in the LiDAR device according to the sixth embodiment, excitation light output from the excitation light source 27 is input to all of the amplifiers 5, that is, to all of the first amplifier 5*a* to the third amplifiers 5*c* by using the excitation light demultiplexer 28. However, in a device in which at least one combination of the amplifier 5 which is an EDFA and the excitation light source 27 which is a CRFL is sufficient, the excitation light output from the excitation light source 27 may be input to at least one of the plurality of amplifiers 5*a* to 5*c*.

In addition, in the LiDAR device according to the sixth embodiment, the EDFA is used for the amplifier 5 and the CRFL is used for the excitation light source 27, but the combination of the amplifier 5 and the excitation light source 27 is not limited thereto, and a combination of any amplifier 5 and any excitation light source 27 may be used depending on design.

Note that the embodiments can be freely combined to each other, any constituent element in each of the embodiments can be modified, or any constituent element in each of the embodiments can be omitted.

INDUSTRIAL APPLICABILITY

The LiDAR device according to the present disclosure is suitable for a wind measurement Doppler LiDAR device, a LiDAR device used for three-dimensional high-speed imaging, and a LiDAR device used for gas concentration measurement.

REFERENCE SIGNS LIST

1: Light source, 2: Demultiplexer/distributor, 3: Demultiplexer, 4: Distributor, 5*a* to 5*c*: Amplifier, 6*a* to 6*c*: Transmission/reception separation device, 7*a* to 7*c*: Light transmission/reception device, 8: Signal processing device, 15: Pre-amplifier, 16: Optical modulator, 22*a* to 22*c*: Numerical aperture converter, 27: Excitation light source, 28: Excitation light demultiplexer

What is claimed is:

1. A LIDAR device comprising:

a light source to output laser light;

a demultiplexer/distributor to receive the laser light output from the light source and to output local oscillation light and a plurality of signal light beams;

a plurality of amplifiers corresponding to the respective signal light beams output from the demultiplexer/distributor, the plurality of amplifiers being configured to amplify the respective signal light beams;

a plurality of light transmission/reception devices disposed in such a manner that radiation directions thereof differ from each other, the plurality of light transmission/reception devices corresponding to the respective amplifiers, and being configured to emit, as transmission light, the signal light beams output from the corresponding amplifiers into space, and to receive, as reception light, scattered light from a measurement target present in space by the transmission light from the light transmission/reception devices;

a signal processing device to calculate a distance to the measurement target and a property of the measurement target on a basis of the reception light from the plurality of light transmission/reception devices and the local oscillation light from the demultiplexer/distributor; and a plurality of transmission/reception separation devices corresponding to the respective amplifiers and the respective light transmission/reception devices, the plurality of transmission/reception separation devices being configured to couple the transmission light from the amplifiers to the respective light transmission/reception devices and to couple the reception light received by the respective light transmission/reception devices to the corresponding signal processing device, wherein the demultiplexer/distributor includes:

a demultiplexer to divide the laser light output from the light source into the local oscillation light and a signal light; and a distributor to divide the signal light from the demultiplexer into the plurality of signal light beams and to output the plurality of signal light beams, wherein the distributor is an optical switch and is disposed in a preceding stage of the plurality of amplifiers.

2. The LiDAR device according to claim 1, further comprising a pre-amplifier to amplify the signal light beams from the demultiplexer and to output the amplified signal light beams to the distributor.

3. The LiDAR device according to claim 1, further comprising a modulator to modulate the signal light from the demultiplexer and to output the modulated signal light to the distributor.

4. The LiDAR device according to claim 1, wherein the light source outputs light having a plurality of mutually different wavelengths, the plurality of amplifiers amplifies the respective light beams having mutually different wavelengths, and the demultiplexer/distributor selects and divides the light input from the light source in such a manner that the light beams are input to amplifiers capable of amplifying the light beams for each of the wavelengths.

5. The LiDAR device according to claim 1, wherein the laser light output from the light source is laser light having a wavelength in an eye safe band.

6. The LiDAR device according to claim 1, wherein each of the plurality of transmission/reception separation devices includes:

a separator having a signal light-based optical path to output signal light amplified by the corresponding amplifier and propagated through an optical fiber cable to light transmission means in such a manner that the signal light is input to the corresponding light transmission/reception device, and a reception light-based optical path to output reception light propagated through the light transmission means from the corresponding light transmission/reception device to an optical fiber cable in such a manner that the reception light is input to the signal processing device; and a numerical aperture converter to perform different numerical aperture conversion between the signal light-based optical path and the reception light-based optical path with the separator.

7. The LiDAR device according to claim 6, wherein the numerical aperture converter is disposed between the separator and an optical fiber cable through which the reception light is propagated to the signal processing device, the separator converts a numerical aperture of an optical fiber cable through which signal light from the amplifier is propagated into a numerical aperture of the light transmission/reception device, the separator converts the numerical aperture of the light transmission/reception device into the numerical aperture of the optical fiber cable through which the signal light from the amplifier is propagated, and the numerical aperture converter converts the numerical aperture converted into the numerical aperture of the optical fiber cable through which the signal light from the amplifier is propagated by the separator into a numerical aperture of the optical fiber cable through which the reception light is propagated to the signal processing device.

8. The LiDAR device according to claim 6, wherein an optical fiber cable through which signal light from the amplifier is propagated is an optical fiber cable using an LMA fiber, and an optical fiber cable through which the reception light is propagated to the signal processing device is an optical fiber cable using an optical fiber having a smaller effective cross-sectional area for a basic mode than the LMA fiber.

9. The LiDAR device according to claim 1, further comprising an excitation light source to output excitation light to at least one of the plurality of amplifiers.

10. The LiDAR device according to claim 9, wherein the excitation light source includes a cascaded Raman fiber laser, and each of the plurality of amplifiers includes an erbium ion-doped fiber amplifier.

11. The LiDAR device according to claim 1, further comprising:

an excitation light source to output excitation light; and an excitation light demultiplexer to divide the excitation light output from the excitation light source and to output the divided excitation light to at least one of the plurality of amplifiers.

12. The LiDAR device according to claim 1, wherein the demultiplexer/distributor includes:

a distributor to divide laser light output from the light source into a plurality of laser light beams and to output the plurality of laser light beams; and a plurality of demultiplexers corresponding to the plurality of laser light beams output from the distributor, respectively, to divide the corresponding laser light into local oscillation light and signal light.

* * * * *